(12) United States Patent
Liu et al.

(10) Patent No.: US 12,355,490 B2
(45) Date of Patent: Jul. 8, 2025

(54) MULTI-CHANNEL RADIO FREQUENCY TRANSCEIVING DEVICE AND METHOD

(71) Applicant: COMBA NETWORK SYSTEMS COMPANY LIMITED, Guangzhou (CN)

(72) Inventors: Jiangtao Liu, Guangzhou (CN); Qiyan Fan, Guangzhou (CN); Jinxiong Zhu, Guangzhou (CN); Weidong Zhong, Guangzhou (CN)

(73) Assignee: COMBA NETWORK SYSTEMS COMPANY LIMITED, Guangzhou (CN)

( * ) Notice: Subject to any disclaimer, the term of this patent is extended or adjusted under 35 U.S.C. 154(b) by 232 days.

(21) Appl. No.: 18/254,556

(22) PCT Filed: Dec. 15, 2021

(86) PCT No.: PCT/CN2021/138439
§ 371 (c)(1),
(2) Date: May 25, 2023

(87) PCT Pub. No.: WO2022/127831
PCT Pub. Date: Jun. 23, 2022

(65) Prior Publication Data
US 2024/0106538 A1    Mar. 28, 2024

(30) Foreign Application Priority Data

Dec. 18, 2020 (CN) .......................... 202011506499.5

(51) Int. Cl.
*H04B 10/2575* (2013.01)
*H04B 10/40* (2013.01)

(52) U.S. Cl.
CPC ....... *H04B 10/25759* (2013.01); *H04B 10/40* (2013.01)

(58) Field of Classification Search
CPC .......................... H04B 10/40; H04B 10/25759
(Continued)

(56) References Cited

U.S. PATENT DOCUMENTS

| 2002/0012495 A1* | 1/2002 | Sasai | H04B 10/25754 385/24 |
| 2004/0008996 A1* | 1/2004 | Aronson | H04B 10/0799 398/202 |

(Continued)

FOREIGN PATENT DOCUMENTS

| CN | 101090298 A | 12/2007 |
| CN | 101304279 A | 11/2008 |

(Continued)

OTHER PUBLICATIONS

Extended European Search Report dated May 16, 2024, Application No./Patent No. 21905757.7-1206 / 4266590 PCT/CN2021138439.

(Continued)

*Primary Examiner* — Dalzid E Singh
(74) *Attorney, Agent, or Firm* — DINSMORE & SHOHL LLP

(57) ABSTRACT

A multi-channel radio frequency transceiving device includes an optical module, a digital signal processing module, a radio frequency transceiving module, a downlink module, and a microprocessing module. The optical module receives an optical signal corresponding to baseband data, converts the optical signal into an electric signal, and outputs the electric signal to the digital signal processing module. The digital signal processing module obtains the baseband data and channel number information on the basis of the electric signal, and allocates and processes the baseband data. The microprocessing module determines the number of working channels of the radio frequency transceiving module, the corresponding number of working channels of the downlink module and a downlink output power on the basis (Continued)

of the channel number information and the baseband data, and closes the remaining channels in the downlink module.

10 Claims, 7 Drawing Sheets

(58) Field of Classification Search
USPC .......................................................... 398/115
See application file for complete search history.

(56) References Cited

U.S. PATENT DOCUMENTS

| | | | |
|---|---|---|---|
| 2004/0022543 A1* | 2/2004 | Hosking | H04B 10/0799 398/135 |
| 2005/0078916 A1* | 4/2005 | Hosking | H04B 10/40 385/12 |
| 2013/0223348 A1 | 8/2013 | Piggin et al. | |
| 2016/0218801 A1* | 7/2016 | Chung | H04B 10/50572 |
| 2017/0126320 A1* | 5/2017 | Cho | H04B 10/25754 |
| 2019/0305820 A1 | 10/2019 | Barzegar et al. | |
| 2022/0077907 A1* | 3/2022 | Wyckoff | H04B 7/0695 |
| 2023/0216587 A1* | 7/2023 | Ghannouchi | H04B 10/25754 398/116 |

FOREIGN PATENT DOCUMENTS

| | | |
|---|---|---|
| CN | 101754348 A | 6/2010 |
| CN | 202565279 U | 11/2012 |
| CN | 103384155 A | 11/2013 |
| CN | 106454560 A | 2/2017 |
| CN | 209089249 U | 7/2019 |
| CN | 112564806 A | 3/2021 |

OTHER PUBLICATIONS

Written Opinion of the International Searching Authority dated Mar. 1, 2022; International Application PCT/CN2021/138439.
Notification of Grant of Invention Patent Right dated Aug. 25, 2021; Application No. 202011506499.5.
Optimized Multi-channel DDC Technology and Its Implementation dated Dec. 2010; vol. 31, No. 12.
International Search Report dated Mar. 1, 2022; Application No. PCT/CN2021/138439.

* cited by examiner

MULTI-CHANNEL RADIO FREQUENCY TRANSCEIVING DEVICE AND METHOD

CROSS REFERENCE TO RELATED APPLICATIONS

This application is the U.S. National Stage of PCT/CN2021/138439 filed on Dec. 15, 2021, which claims the priority of the Chinese patent application No. 202011506499.5, filed on Dec. 18, 2020 and entitled "MULTI-CHANNEL RADIO FREQUENCY TRANSCEIVING DEVICE AND METHOD", the entire contents of which are incorporated herein by reference.

FIELD OF THE INVENTION

The present disclosure relates to the technical field of mobile communication, and in particular to a multi-channel radio frequency transceiving device and method.

BACKGROUND OF THE INVENTION

With the rapid development of information and communication technology, the traffic volume, communication rate and bandwidth carried by the communication network have increased sharply, and 5G multi-channel communication equipment has gradually become the mainstream equipment. In order to meet the communication requirements of different scenarios, different numbers of channels and sending powers can be set for the equipment. For example, for occasions with high capacity requirements, equipment with more channels is generally used. For areas with small wide-area traffic, high-power sending equipment with fewer channels is generally used. Once the traditional multi-channel equipment is put into a station, it is difficult to change the number of channels and sending power, which is not conducive to the universality and intelligence of the equipment.

To meet different demands, the equipment hardware can be replaced. However, frequent replacement of hardware equipment will increase the development cost and maintenance cost of the equipment, resulting in a waste of resources. For example, an area under construction may have low traffic demands at present. However, after the area develops to a mature and stable state, the population usually increases sharply. At this time, it is difficult for the hardware to support capacity expansion. Therefore, it is usually required to rebuild the station, resulting in a waste of resources. Therefore, compatibility design and high-precision control of the remote communication equipment are the key to the good subsequent application of the entire 5G communication equipment. Therefore, in the present case where the communication equipment with a fixed number of channels is dominant, it is particularly important to design and develop multi-channel communication equipment that is flexible and controllable according to traffic needs.

SUMMARY OF THE INVENTION (I) Technical Problem to be Solved

The technical problem to be solved by the present disclosure is that the existing multi-channel communication equipment cannot be flexibly and controllably developed on the basis of traffic demands.

(II) Technical Solutions

In order to solve the above technical problem, embodiments of the present disclosure provide a multi-channel radio frequency transceiving device and method.

In a first aspect, the present disclosure provides a multi-channel radio frequency transceiving device, including: an optical module, a digital signal processing module, a radio frequency transceiving module, a downlink module and a microprocessing module.

An input terminal of the optical module is configured to receive an optical signal corresponding to baseband data, and an output terminal of the optical module is connected to an input terminal of the digital signal processing module. An interactive terminal of the digital signal processing module is connected to an interactive terminal of the radio frequency transceiving module, and a plurality of output terminals of the radio frequency transceiving module are connected to a plurality of input terminals of the downlink module in one-to-one correspondence. Output terminals of the microprocessing module are respectively connected to a control terminal of the optical module, a control terminal of the digital signal processing module and a plurality of control terminals of the downlink module in one-to-one correspondence.

The optical module is configured to convert the optical signal into an electric signal. The digital signal processing module is configured to obtain the baseband data and channel number information on the basis of the electric signal, and allocate and process the baseband data on the basis of the channel number information. The microprocessing module is configured to determine the number of working channels of the radio frequency transceiving module, the corresponding number of working channels of the downlink module and a downlink output power on the basis of the channel number information and the baseband data, and close the remaining channels in the downlink module. Each working channel of the radio frequency transceiving module is configured to perform up-conversion on the received baseband data, and each working channel of the downlink module correspondingly processes and outputs the up-converted baseband data.

The number of channels of the downlink module which are in a working state is adjustable according to different channel number information.

In a second aspect, the present disclosure further provides a multi-channel radio frequency transceiving device executable by any of the multi-channel radio frequency transceiving devices above. The method includes:

receiving, by an optical module, an optical signal corresponding to baseband data, and converting the optical signal into an electric signal;

obtaining, by a digital signal processing module, the corresponding baseband data and channel number information on the basis of the electric signal, and allocating and processing the baseband data on the basis of the channel number information;

determining, by a microprocessing module, the number of working channels of a radio frequency transceiving module, the corresponding number of working channels of a downlink module and a downlink output power on the basis of the channel number information and the baseband data, and closing the remaining channels in the downlink module;

performing, by each working channel of the radio frequency transceiving module, up-conversion processing on the received baseband data; and processing and outputting correspondingly, by each working channel of the downlink module, the up-converted baseband data.

(III) Beneficial Effects

Compared with related art, the above technical solutions provided by the embodiments of the present disclosure has the following advantages:

The multi-channel radio frequency transceiving device provided by the embodiment of the present disclosure includes the optical module, the digital signal processing module, the radio frequency transceiving module, the downlink module and the microprocessing module. The optical module is set to receive the optical signal corresponding to the baseband data, and convert the optical signal into the electric signal. The digital signal processing module may determine the channel number information on the basis of the electric signal corresponding to the baseband data, and allocate and process the baseband data. The microprocessing module reads the channel number information and upper computer control information, thereby determining the number of working channels and the maximum downlink output power of the downlink module and closing the unnecessary hardware channels in the downlink module. The microprocessing module sets the channels of the radio frequency transceiving module and the channels of the downlink module on the basis of the determined information about the number of working channels and the power, and processes the downlink signal, and then each channel of the downlink module in the working state correspondingly outputs the processed downlink signal. In this way, the number of sending channels can be changed adaptively, which is beneficial to realizing intelligent control and reduce the power consumption of equipment. Moreover, the maximum sending power of the channel can be changed according to different levels, so that the multi-channel radio frequency transceiving device is suitable for various signal coverage occasions and is high in applicability and easy to implement. Besides, there is no need to replace the equipment hardware or rebuild the station, which is beneficial to saving the resources.

DETAILED DESCRIPTION OF THE INVENTION

With regard to the development demand of mobile communication, the technical solutions of embodiments of the present disclosure provide a multi-channel radio frequency transceiving device (also referred to herein as "transceiving device" or "device") and a multi-channel radio frequency transceiving method (also referred to herein as "transceiving method" or "method"), which are flexible in control, beneficial to reducing the power consumption and variable in the number of working channels. The multi-channel radio frequency transceiving device includes an optical module, a digital signal processing module, a radio frequency transceiving module, a downlink module and a microprocessing module. The digital signal processing module may determine, on the basis of an electric signal corresponding to baseband data obtained by receiving and converting an optical signal by the optical module, channel number information, and allocate and process the baseband data. The microprocessing module reads the channel number information and upper computer control information, thereby determining downlink channels and the maximum downlink output power and closing the unnecessary hardware channels (detailed below). The microprocessing module sets the channels of the radio frequency transceiving module and the channels of the downlink module on the basis of the determined information about the number of working channels and the power, and processes the downlink signal, and then each channel of the downlink module in a working state correspondingly outputs the processed downlink signal. In this way, the transceiving device and method provided by the embodiments of the present disclosure can adaptively change the number of sending channels, which is beneficial to reducing the power consumption of equipment. Moreover, the maximum sending power of the channel can be changed according to different levels, so that the multi-channel radio frequency transceiving device and method are suitable for various signal coverage occasions and are high in applicability and easy to implement. Besides, there is no need to replace the equipment hardware or rebuild the station, which is beneficial to saving the resources. The transceiving device and method provided by the embodiments of the present disclosure will be illustrated exemplarily with reference to FIG. 1 to FIG. 8.

Figure 1:
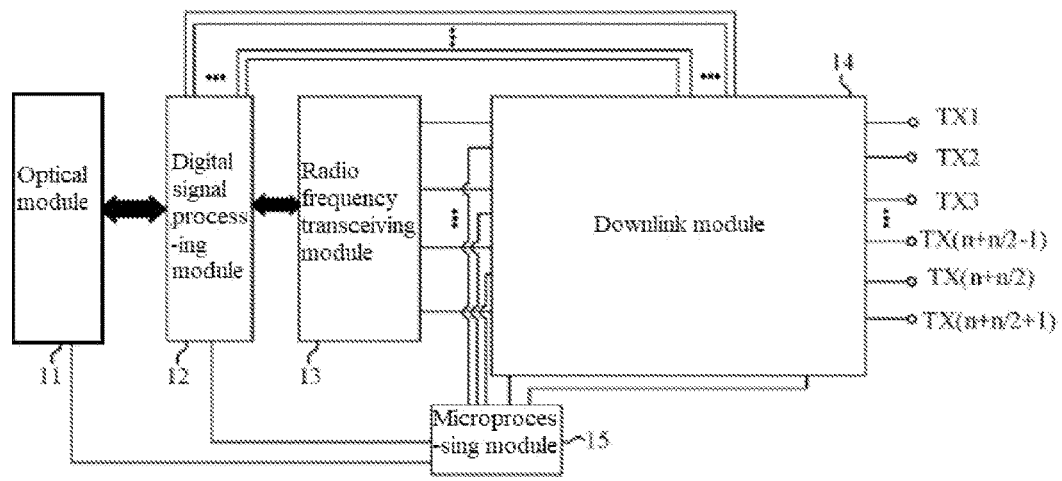
FIG. 1 is a schematic structural diagram of a multi-channel radio frequency transceiving device according to an embodiment of the present disclosure.

FIG. 1 is a schematic structural diagram of a multi-channel radio frequency transceiving device according to an embodiment of the present disclosure. With reference to FIG. 1, the device is remote communication equipment, which may include: an optical module 11, a digital signal processing module 12, a radio frequency transceiving module 13, a downlink module 14 and a microprocessing module 15. An input terminal of the optical module 11 is configured to receive an optical signal corresponding to baseband data, and an output terminal of the optical module 11 is connected to an input terminal of the digital signal processing module 12. An interactive terminal of the digital signal processing module 12 is connected to an interactive terminal of the radio frequency transceiving module 13, and a plurality of output terminals of the radio frequency transceiving module 13 are connected to a plurality of input terminals of the downlink module 14 in one-to-one correspondence. Output terminals of the microprocessing module 15 are respectively connected to a control terminal of the optical module 11, a control terminal of the digital signal processing module 12 and a plurality of control terminals of the downlink module 14 in one-to-one correspondence. The optical module 11 is configured to convert the optical signal into an electric signal. The digital signal processing module 12 is configured to obtain the baseband data and channel number information on the basis of the electric signal, and allocate and process the baseband data on the basis of the channel number information. The microprocessing module 15 is configured to determine the number of working channels of the radio frequency transceiving module 13, the corresponding number of working channels of the downlink module 14 and a downlink output power on the basis of the channel number information and the baseband data, and close the remaining channels in the downlink module 14. Each working channel of the radio frequency transceiving module 13 performs up-conversion on the received baseband data, and each working channel of the downlink module 14 correspondingly processes and outputs the up-converted baseband data. The number of channels of the downlink module 14 which are in a working state is adjustable according to different channel number information.

The optical module 11 may receive the optical signal that is sent by a base station and transmitted through an optical fiber. Further, the optical module 11 converts the optical signal corresponding to the baseband data into the electric signal, so that the subsequent circuit can perform further processing.

The digital signal processing module 12 performs signal interaction with the optical module 11. During data downlink transmission, the digital signal processing module 12 receives the electric signal converted by the optical module 11, converts the electric signal into a baseband signal corresponding to a 5G or 4G format or other formats, obtains the channel number information and the baseband data on the basis of the electric signal, and allocates and processes the baseband data on the basis of the channel number information. The radio frequency transceiving module 13 performs signal interaction with the digital signal processing module 12, and the downlink module 14 is configured to receive a downlink signal transmitted by the radio frequency transceiving module 13. Specifically, the microprocessing module 15 obtains the channel number information of the digital signal processing module 12 and upper computer control information, thereby determining downlink channels (including downlink channels of the radio frequency transceiving module 13 and downlink channels of the downlink module 14) and the downlink output power and closing the unnecessary hardware channels (including channels in the radio frequency transceiving module 13 and hardware channels in the downlink module 14, detailed below). Each downlink channel in the radio frequency transceiving module 13 determined by the microprocessing module 15 performs up-conversion on the received baseband data (also referred to as "downlink baseband signal"), and outputs the up-converted baseband data to the corresponding input terminal in the downlink module 14. After the downlink module 14 receives the up-converted baseband data and performs amplification or power allocation on the up-converted baseband data, the processed baseband data is output by the output terminal of the corresponding downlink channel of the downlink module 14.

The number of channels of the downlink module 14 which are in the working state is adjustable according to different channel number information determined on the basis of the baseband data under the control of the microprocessing module 15, thereby realizing the variable number of working channels of the device.

The device provided by the embodiment of the present disclosure includes the optical module 11, the digital signal processing module 12, the radio frequency transceiving module 13, the downlink module 14 and the microprocessing module 15. The optical module 11 receives the optical signal corresponding to the baseband data, and converts the optical signal into the electric signal. The digital signal processing module 12 may determine the channel number information on the basis of the electric signal corresponding to the baseband data, and allocate and process the baseband data. The microprocessing module 15 reads the channel number information and the upper computer control information, thereby determining the number of working channels and the maximum downlink output power of the downlink module and closing the unnecessary hardware channels in the downlink module. The microprocessing module 15 sets the channels of the radio frequency transceiving module 13 and the channels of the downlink module 14 on the basis of the determined information about the number of working channels and the power, and processes the downlink signal, and then each channel of the downlink module 14 in the working state correspondingly outputs the processed downlink signal. In this way, the number of sending channels can be changed adaptively on the basis of the baseband data, which is beneficial to realizing intelligent control and reduce the power consumption of equipment. Moreover, the sending power of the downlink channel can be allocated according to demands, so that the device is suitable for various signal coverage occasions and is high in applicability and easy to implement. Besides, there is no need to replace the equipment hardware or rebuild the station, which is beneficial to saving the resources.

Figure 2:
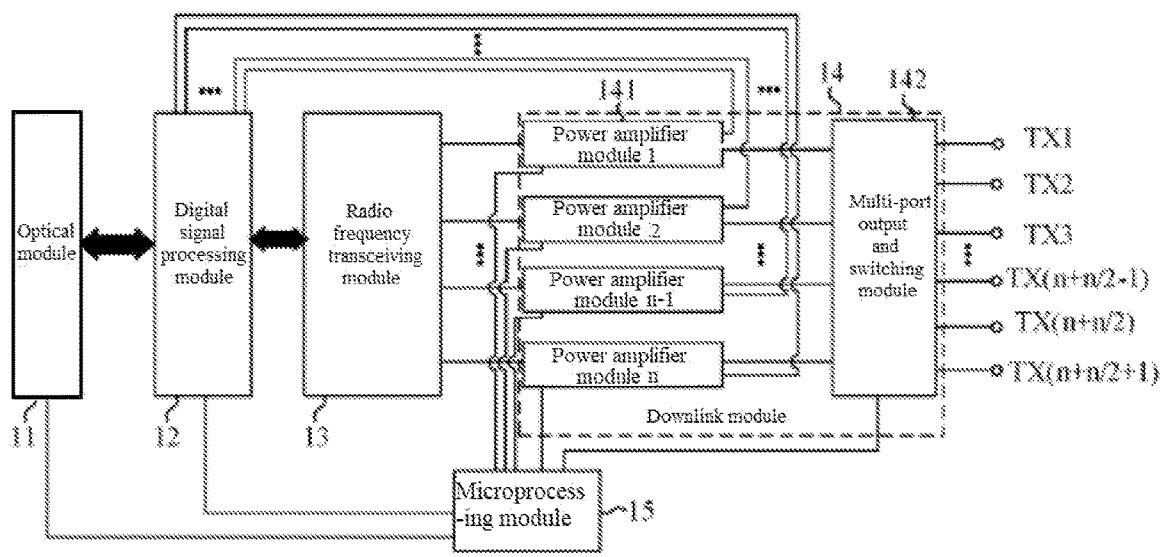
FIG. 2 is a structural schematic diagram of another multi-channel radio frequency transceiving device according to an embodiment of the present disclosure.

In an embodiment, FIG. 2 is a structural schematic diagram of another multi-channel radio frequency transceiving device according to the embodiment of the present disclosure. On the basis of FIG. 1, with reference to FIG. 2, the downlink module 14 includes a plurality of power amplifier modules 141 and a multi-port output and switching module 142. Output terminals of the plurality of power amplifier modules 141 are connected to a plurality of input terminals of the multi-port output and switching module 142 in one-to-one correspondence, input terminals of the plurality of power amplifier modules 141 are connected to the plurality of output terminals of the radio frequency transceiving module 13 in one-to-one correspondence, sampling terminals of the plurality of power amplifier modules 141 are connected to a plurality of sampling signal receiving terminals of the digital signal processing module 12 in one-to-one correspondence, and control terminals of the plurality of power amplifier modules 141 are connected to a plurality of output terminals of the microprocessing module 15 in one-to-one correspondence. A control terminal of the multi-port output and switching module 142 is connected to one output terminal of the microprocessing module 15.

The power amplifier module 141 may amplify the signal up-converted by the radio frequency transceiving module 13 and transmit the amplified signal to the multi-port output and switching module 142, and the channel of the multi-port output and switching module 142 determined on the basis of the microprocessing module 15 outputs the downlink signal.

Exemplarily, FIG. 2 shows the power amplifier modules 141, including a power amplifier module 1, a power amplifier module 2, . . . , a power amplifier module n−1 and a power amplifier module n. n is a positive integer, for example, 4. In other implementations, the number of the power amplifier modules 141 may be set according to the demands of the transceiving device, which is not limited in the embodiment of the present disclosure.

Exemplarily, corresponding to the number n of the power amplifier modules 141, the output terminals of the multi-port output and switching module 142 may include a first output terminal TX1, a second output terminal TX2, a third output terminal TX3, . . . , an (n+n/2−1)-th output terminal TX(n+n/2−1), an (n+n/2)-th output terminal TX(n+n/2) and an (n+n/2+1)-th output terminal TX(n+n/2+1). Exemplarily, when the number of the power amplifier modules 141 is 4, the number of the output terminals of the multi-port output and switching module 142 may be 7, that is, including a first output terminal TX1 to a seventh output terminal TX7. In other implementations, when the number of the power amplifier modules 141 changes, the number of the output terminals of the multi-port output and switching module 142 changes accordingly.

The control terminals of the power amplifier module 141 are connected to the microprocessing module 15. Under the control of the microprocessing module 15, the power amplifier module 141 is in a working state, that is, the corresponding downlink channel works; or the power amplifier module 141 is in a non-working state, that is, the corresponding downlink channel does not work.

In addition to the input terminal, the output terminal and the control terminal, the power amplifier module 141 may further include a sampling terminal. The sampling terminals of the power amplifier modules 141 are connected to sampling signal receiving terminals of the digital signal processing module 12 in one-to-one correspondence. The digital signal processing module 12 performs analysis on the basis of the received sampled data and adjusts a power amplification model, which can realize closed-loop control of the downlink signal, thereby being beneficial to reducing the power consumption of the power amplifier modules 141 and the overall power consumption of the device.

Exemplarily, a signal of the sampling terminal is converted by the radio frequency transceiving module 13 into an intermediate-frequency signal, which is transmitted to the digital signal processing module 12 and processed.

Figure 3:
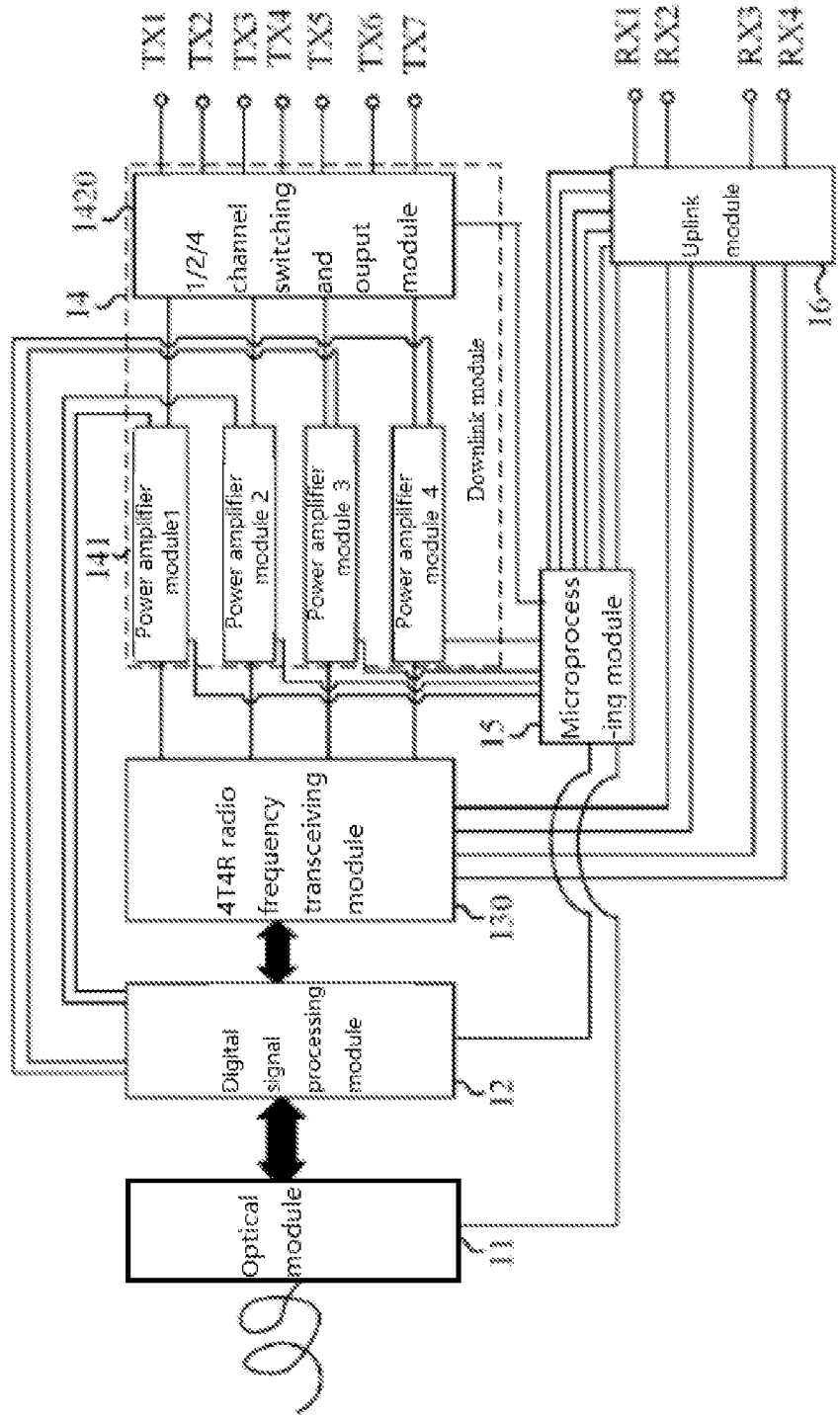
FIG. 3 is a schematic structural diagram of still another multi-channel radio frequency transceiving device according to an embodiment of the present disclosure.

In an embodiment, FIG. 3 is a structural schematic diagram of still another multi-channel radio frequency transceiving device according to the embodiment of the present disclosure. On the basis of FIG. 2, with reference to FIG. 3, the multi-port output and switching module 142 includes a 1/2/4 channel switching and output module 1420, and the radio frequency transceiving module 13 includes a 4T4R radio frequency transceiving module 130.

The 4T4R radio frequency transceiving module 130 can realize uplink and downlink transmission of 4-channel data at most, and the 1/2/4 channel switching and output module 1420 can realize downlink output of single-channel, double-channel and four-channel data.

Thus, the channels of the 4T4R radio frequency transceiving module 130 and the 1/2/4 channel switching and output module 1420 are controlled by the microprocessing module 15, so that the device can realize single-channel, double-channel and four-channel signal transceiving switching according to the capacity and power requirements.

Figure 4:
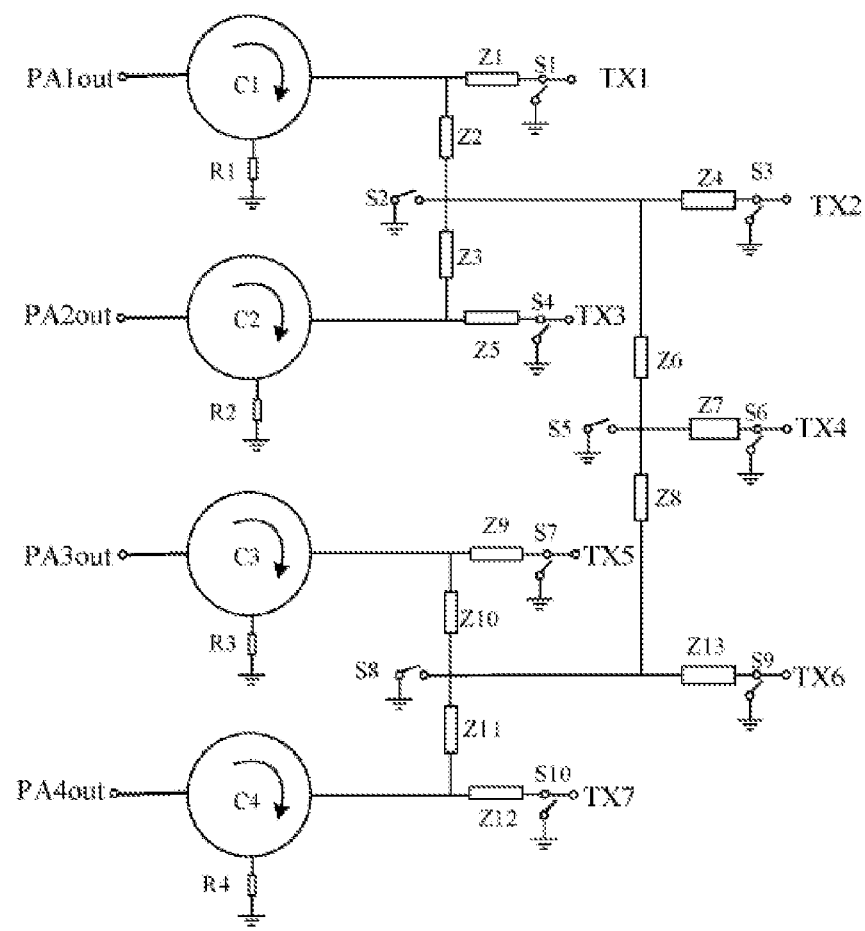
FIG. 4 is a schematic diagram of a 1/2/4 channel switching and output module according to an embodiment of the present disclosure.

The circuit structure of the 1/2/4 channel switching and output module 1420 will be illustrated exemplarily with reference to FIG. 4.

In an embodiment, FIG. 4 is a structural schematic diagram of the 1/2/4 channel switching and output module according to the embodiment of the present disclosure. With reference to FIG. 3 and FIG. 4, the 1/2/4 channel switching and output module 1420 includes a first circulator C1, a second circulator C2, a third circulator C3, a fourth circulator C4, a first resistor R1, a second resistor R2, a third resistor R3, a fourth resistor R4, a first radio frequency switch S1, a second radio frequency switch S2, a third radio frequency switch S3, a fourth radio frequency switch S4, a fifth radio frequency switch S5, a sixth radio frequency switch S6, a seventh radio frequency switch S7, an eighth radio frequency switch S8, a ninth radio frequency switch S9, a tenth radio frequency switch S10, a first microstrip line Z1, a second microstrip line Z2, a third microstrip line Z3, a fourth microstrip line Z4, a fifth microstrip line Z5, a sixth microstrip line Z6, a seventh microstrip line Z7, an eighth microstrip line Z8, a ninth microstrip line Z9, a tenth microstrip line Z10, an eleventh microstrip line Z11, a twelfth microstrip line Z12 and a thirteenth microstrip line Z13. An isolation terminal of the first circulator C1 is grounded through the first resistor R1, an isolation terminal of the second circulator C2 is grounded through the second resistor R2, an isolation terminal of the third circulator C3 is grounded through the third resistor R3, and an isolation terminal of the fourth circulator C4 is grounded through the fourth resistor R4. An input terminal of the first circulator C1, an input terminal of the second circulator C2, an input terminal of the third circulator C3 and an input terminal of the fourth circulator C4 are respectively connected to output terminals of four of the power amplifier modules 141 in one-to-one correspondence. An output terminal of the first circulator C1, a first terminal of the first microstrip line Z1 and a first terminal of the second microstrip line Z2 are connected, a second terminal of the first microstrip line Z1 is connected to a first output terminal TX1 of the 1/2/4 channel switching and output module 1420, the second terminal of the first microstrip line Z1 is connected to a first terminal of the first radio frequency switch S1, and a second terminal of the first radio frequency switch S1 is grounded. An output terminal of the second circulator C2, a first terminal of the third microstrip line Z3 and a first terminal of the fifth microstrip line Z5 are connected, a second terminal of the fifth microstrip line Z5 is connected to a third output terminal TX3 of the 1/2/4 channel switching and output module 1420, the second terminal of the fifth microstrip line Z5 is connected to a first terminal of the fourth radio frequency switch S4, and a second terminal of the fourth radio frequency switch S4 is grounded. A second terminal of the third microstrip line Z3, a second terminal of the second microstrip line Z2, a second terminal of the fourth microstrip line Z4 and a first terminal of the sixth microstrip line Z6 are connected to each other and connected to a first terminal of the second radio frequency switch S2, a second terminal of the second radio frequency switch S2 is grounded, a first terminal of the fourth microstrip line Z4 is connected to a second output terminal TX2 of the 1/2/4 channel switching and output module 1420, the first terminal of the fourth microstrip line Z4 is connected to a first terminal of the third radio frequency switch S3, and a second terminal of the third radio frequency switch S3 is grounded. An output terminal of the third circulator C3, a first terminal of the ninth microstrip line Z9 and a first terminal of the tenth microstrip line Z10 are connected, a second terminal of the ninth microstrip line Z9 is connected to a fifth output terminal TX5 of the 1/2/4 channel switching and output module 1420, the second terminal of the ninth microstrip line Z9 is connected to a first terminal of the seventh radio frequency switch S7, and a second terminal of the seventh radio frequency switch S7 is grounded. An output terminal of the fourth circulator C4, a first terminal of the eleventh microstrip line Z11 and a first terminal of the twelfth microstrip line Z12 are connected, a second terminal of the twelfth microstrip line Z12 is connected to a seventh output terminal TX7 of the 1/2/4 channel switching and output module 1420, the second terminal of the twelfth microstrip line Z12 is connected to a first terminal of the tenth radio frequency switch S10, and a second terminal of the tenth radio frequency switch S10 is grounded. A second terminal of the tenth microstrip line Z10, a second terminal of the eleventh microstrip line Z11, a second terminal of the thirteenth microstrip line Z13 and a first terminal of the eighth microstrip line Z8 are connected to each other and connected to a first terminal of the eighth radio frequency switch S8, a second terminal of the eighth radio frequency switch S8 is grounded, a first terminal of the thirteenth microstrip line Z13 is connected to a sixth output terminal TX6 of the 1/2/4 channel switching and output module 1420, the first terminal of the thirteenth microstrip line Z13 is connected to a first terminal of the ninth radio frequency switch S9, and a second terminal of the ninth radio frequency switch S9 is grounded. A second terminal of the sixth microstrip line Z6, a second terminal of the eighth microstrip line Z8 and a first terminal of the seventh microstrip line Z7 are connected to each other and connected to a first terminal of the fifth radio frequency switch S5, a second terminal of the fifth radio frequency switch S5 is grounded, a second terminal of the seventh microstrip line Z7 is connected to a fourth output terminal TX4 of the 1/2/4 channel switching and output module 1420, the second terminal of the seventh microstrip line Z7 is connected to a first terminal of the sixth radio frequency switch S6, and a second terminal of the sixth radio frequency switch S6 is grounded.

The 1/2/4 channel switching and output module 1420 includes 4 circulators (C1, C2, C3, C4), 4 resistors (R1, R2, R3, R4), 10 radio frequency switches (S1-S10) and 13 microstrip lines (Z1-Z13).

The circulator is a multi-port device that transmits the incident wave entering any of its ports into the next port in the direction determined by the static bias magnetic field. It is a non-reciprocal device having multiple terminals, and can transmit high-frequency signal energy in only one direction. The radio frequency switch, also known as microwave switch, can control transfer in the downlink signal channels. The microstrip line is a microwave transmission line composed of a single conductor strip supported on a dielectric substrate, and it is suitable for making planar transmission lines of microwave integrated circuits. Compared with metal waveguide, the microstrip line has the characteristics of small size, light weight, wide frequency band, high reliability, low manufacturing cost, etc.

In an embodiment, with continued reference to FIG. 4, an electrical length of each microstrip line is a quarter of a wavelength, and the wavelength is a wavelength in a working frequency range. Characteristic impedances of the first microstrip line Z1, the second microstrip line Z2, the third microstrip line Z3, the fifth microstrip line Z5, the ninth microstrip line Z9, the eleventh microstrip line Z11 and the twelfth microstrip line Z12 are a first characteristic impedance A1, characteristic impedances of the sixth microstrip line Z6 and the eighth microstrip line Z8 are a second characteristic impedance A2, characteristic impedances of the fourth microstrip line Z4 and the thirteenth microstrip line Z13 are a third characteristic impedance A3, and a characteristic impedance of the seventh microstrip line Z7 is a fourth characteristic impedance A4. A1, A2, A3 and A4 satisfy:

$$A1=2*A2=X, A3=\sqrt{X^2/2}, A4=\sqrt{X^2/4},$$

where X is a constant.

For example, X=50 ohms, then A1=50 ohms, A2=25 ohms, A3=35.4 ohms, and A4=25 ohms.

Based on the above limitation to the microstrip lines, the working principle of the device will be illustrated exemplarily below with reference to FIG. 3 and FIG. 4:

First, the optical signal is converted into the electric signal by the optical module 11, and the digital signal processing module 12 recovers original information on the basis of the electric signal, including baseband signals and channel number information. In this embodiment, the original number of data channels is 2, the maximum downlink sending power level is 20 W/CH, and the peak to average power ratio (PAPR) of the signal is 8 dB.

Then, the digital signal processing module 12 divides the original two-channel baseband data into two groups. The first group is 0-phase-difference equal power data of the original first-channel baseband signal, that is, in the first group, the original first-channel baseband signal is divided into two identical equal-amplitude equal-phase baseband signals, corresponding to 1st and 2nd downlink baseband data. The second group is 0-phase-difference equal power data of the original second-channel baseband signal, that is, in the second group, the original second-channel baseband signal is divided into two identical equal-amplitude equal-phase baseband signals, corresponding to 3rd and 4th downlink baseband data.

Then, the microprocessing module 15 opens all channels of the 4T4R radio frequency transceiving module 130 according to the obtained channel number information of the digital signal processing module 12 and the upper computer control information, and enables simultaneous control of the 4 high-power power amplifier modules 141.

Thus, the first group of baseband signals processed by the digital signal processing module 12 respectively enter the 1st and 2nd downlink channels of the 4T4R radio frequency transceiving module 130, and are correspondingly output to the power amplifier module 1 and the power amplifier module 2. The second group of baseband signals processed by the digital signal processing module 12 respectively enter the 3rd and 4th downlink channels of the 4T4R radio frequency transceiving module 130, and are correspondingly output to the power amplifier module 3 and the power amplifier module 4. The 4 downlink channels of the 4T4R radio frequency transceiving module 130 are identical, and the 4 power amplifier modules are all high-power power amplifier modules that are also identical. The power amplifier module has a peak power of 120 W, and when PAPR=8 dB, Pout≤10 W.

Then, the signals amplified by the power amplifier modules enter the 1/2/4 channel switching and output module 1420, and the microprocessing module 15 controls the second radio frequency switch S2, the third radio frequency switch S3, the eighth radio frequency switch S8 and the ninth radio frequency switch S9 to be opened, and the first radio frequency switch S1, the fourth radio frequency switch S4, the fifth radio frequency switch S5, the sixth radio frequency switch S6, the seventh radio frequency switch S7 and the tenth radio frequency switch S10 to be closed. Thereby, the 4 radio frequency signal inputs of the 1/2/4 channel switching and output module 1420 become two outputs, that is, the radio frequency signals are output through the second output terminal TX2 and the sixth output terminal TX6, with an output power of 20 W/CH.

This realizes two-channel output, and the output power of each channel is 20 W/CH.

In an embodiment, if the number of working channels obtained by the microprocessing module 15 from the baseband data recovered by the digital signal processing module 12 becomes 2, the maximum sending power becomes 10 W/CH. Then, the microprocessing module 15 closes the 3rd and 4th uplink channels and the 3rd and 4th downlink channels of the 4T4R radio frequency transceiving module 130, and the 3rd and 4th channels of the uplink module, and turns off the power amplifier module 3 and the power amplifier module 4 of the high-power power amplifier modules.

At the same time, the digital signal processing module 12 sends the original two-channel baseband data respectively to the 1st and 2nd downlink channels of the 4T4R radio frequency transceiving module 130, and then, the two-channel baseband data are amplified by the 1st and 2nd high-power power amplifier modules, i.e., the power amplifier module 1 and the power amplifier module 2, and output to the 1/2/4 channel switching and output module 1240.

Moreover, the microprocessing module 15 controls the first radio frequency switch S1 and the fourth radio frequency switch S4 to be opened, and the remaining radio frequency switches, including the second radio frequency switch S2, the third radio frequency switch S3, the fifth radio frequency switch S5, the sixth radio frequency switch S6, the seventh radio frequency switch S7, the eighth radio frequency switch S8, the ninth radio frequency switch S9 and the tenth radio frequency switch S10 to be closed. Thereby, the downlink signals are output, via the 1st and 2nd downlink channels of the 4T4R radio frequency transceiving module 130 and the 1st and 2nd modules of the high-power power amplifier modules, from the first output terminal TX1 and the third output terminal TX3 of the 1/2/4 channel switching and output module 1240, with an output power of 10 W/CH.

This realizes two-channel output, and the output power of each channel is 10 W/CH.

In an embodiment, if the number of working channels obtained by the microprocessing module 15 from the baseband data recovered by the digital signal processing module 12 becomes 4, the maximum sending power becomes 5 W/CH. Then the microprocessing module 15 opens all the channels of the 4T4R radio frequency transceiving module 130, and enables simultaneous control of the 4 high-power power amplifier modules 141.

At the same time, the microprocessing module 15 controls the first radio frequency switch S1, the fourth radio frequency switch S4, the seventh radio frequency switch S7 and the tenth radio frequency switch S10 to be opened, and the second radio frequency switch S2, the third radio frequency switch S3, the fifth radio frequency switch S5, the sixth radio frequency switch S6, the eighth radio frequency switch S8 and the ninth radio frequency switch S9 to be closed. Thereby, the downlink signals are output, via the downlink channels of the 4T4R radio frequency transceiving module 130 and the high-power power amplifier modules 141, from the first output terminal TX1, the third output terminal TX3, the fifth output terminal TX5 and the seventh output terminal TX7 of the 1/2/4 channel switching and output module 1240, with an output power of 5 W/CH.

This realizes four-channel output, and the output power of each channel is 5 W/CH.

In an embodiment, if the number of working channels obtained by the microprocessing module 15 from the baseband data recovered by the digital signal processing module 12 becomes 1, the maximum sending power becomes 40 W/CH. Then the microprocessing module 15 opens all the channels of the 4T4R radio frequency transceiving module 130, and enables simultaneous control of the 4 high-power power amplifier modules 141.

At the same time, the microprocessing module 15 controls the second radio frequency switch S2, the fifth radio frequency switch S5, the sixth radio frequency switch S6 and the eighth radio frequency switch S8 to be opened, and the first radio frequency switch S1, the third radio frequency switch S3, the fourth radio frequency switch S4, the seventh radio frequency switch S7, the ninth radio frequency switch S9 and the tenth radio frequency switch S10 to be closed. Thereby, the downlink signal is output, via the downlink channel of the 4T4R radio frequency transceiving module 130 and the high-power power amplifier module 141, from the sixth output terminal TX6 of the 1/2/4 channel switching and output module 1240, with an output power of 40 W/CH.

This realizes one-channel output, and the output power of each channel is 40 W/CH.

Thereby, on the basis of the channel number information of the digital signal processing module 12, the microprocessing module 15 can realize switching in the number of working channels and adjustment in power by adaptively controlling the number of working channels of the radio frequency transceiving module 13 and the downlink module 14, and the adaptability is strong.

Figure 5:
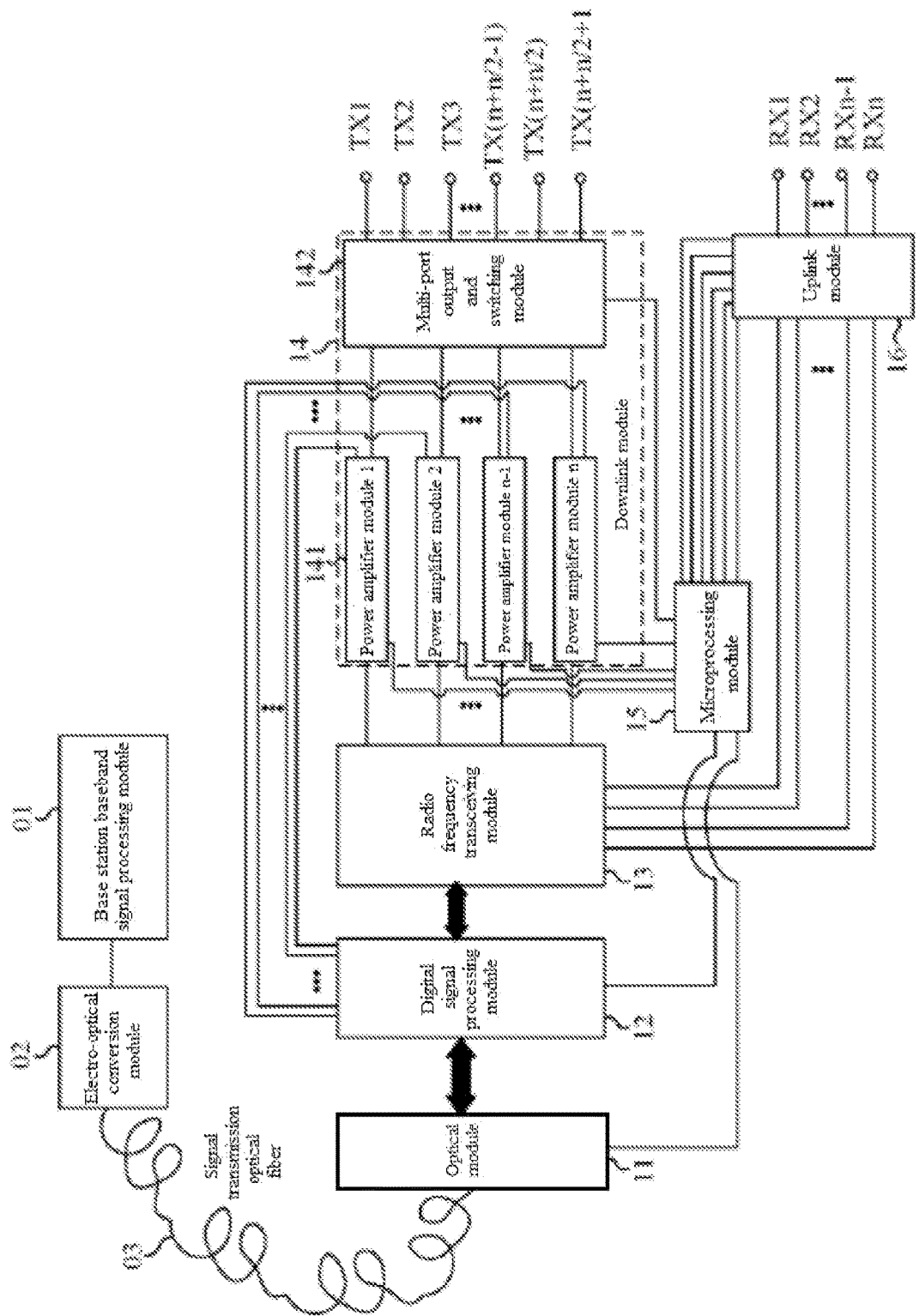
FIG. 5 is a schematic structural diagram of still another multi-channel radio frequency transceiving device according to an embodiment of the present disclosure.

In an embodiment, FIG. 5 is a structural schematic diagram of still another multi-channel radio frequency transceiving device according to the embodiment of the present disclosure. On the basis of FIG. 1, with reference to FIG. 5, the device may further include a base station baseband signal processing module 01, an electro-optical conversion module 02 and a signal transmission optical fiber 03. The base station baseband signal processing module 01 is configured to convert communication baseband data into an initial electric signal, the initial electric signal is converted into the optical signal by the electro-optical conversion module 02, and the optical signal is transmitted to the optical module 11 by the signal transmission optical fiber 03.

The base station baseband signal processing module 01 and the electro-optical conversion module 02 are arranged in the base station, and the remote communication equipment and the base station perform signal transmission through the signal transmission optical fiber 03, which can reduce the signal attenuation, ensure the high fidelity of signals and realize long-distance transmission.

In an embodiment, with continued reference to FIG. 3 or FIG. 5, the device may further include an uplink module 16. A plurality of input terminals of the uplink module 16 are respectively configured to receive uplink signals of different channels, a plurality of control terminals of the uplink module 16 are respectively connected to a plurality of output terminals of the microprocessing module 15 in one-to-one correspondence, and a plurality of output terminals of the uplink module 16 are respectively connected to a plurality of receiving terminals of the radio frequency transceiving module 13 in one-to-one correspondence. The microprocessing module 15 is configured to control the radio frequency transceiving module 13 to open a channel corresponding to a working channel of the uplink module 16, so as to transmit the uplink signal received by the uplink module 16 to the digital signal processing module 12 after down-conversion processing.

Exemplarily, with reference to FIG. 3, when the 4T4R radio frequency transceiving module 130 includes 4 channels, the uplink module 16 may include four uplink signal receiving terminals, respectively shown as a first receiving terminal RX1, a second receiving terminal RX2, a third receiving terminal RX3 and a fourth receiving terminal RX4. Or with reference to FIG. 5, when the radio frequency transceiving module 13 includes n channels, the uplink module 16 may include N uplink signal receiving terminals, respectively shown as a first receiving terminal RX1 to an n-th receiving terminal RXn.

Corresponding to the downlink module 14, the number of working channels of the uplink module 16 is adaptively adjustable under the control of the microprocessing module 15.

Exemplarily, while transceiving signals through two channels, the microprocessing module 15 controls the 1st and 2nd channels of the uplink module 16 to be opened and the 1st and 2nd uplink channels of the 4T4R radio frequency transceiving module 130 to be opened, receives the uplink signals through the first receiving terminal RX1 and the second receiving terminal RX2, and closes the 3rd and 4th channels of the uplink module 16 and the 3rd and 4th uplink channels of the 4T4R radio frequency transceiving module 130. The uplink module 16 transmits the uplink signals received through the first receiving terminal RX1 and the second receiving terminal to the 1st and 2nd uplink channels of the 4T4R radio frequency transceiving module 130. After down-conversion processing, the two intermediate-frequency signals reach the digital signal processing module 12.

In an embodiment, the digital signal processing module 12 transmits the down-converted uplink signal to the optical module 11, and the optical module 11 performs electro-optical processing on the received uplink signal and transmits the uplink signal after the electro-optical processing to the base station baseband signal processing module 01 through the signal transmission optical fiber 03.

The uplink signal is processed by the digital signal processing module 12 and sent into the optical module 11, and the optical module 11 performs electro-optical conversion on the uplink signal and outputs the optical signal to the base station through the signal transmission optical fiber.

Thus, the uplink signal is transmitted from the remote communication equipment to the base station.

Based on the same inventive concept, an embodiment of the present disclosure further provides a multi-channel radio frequency transceiving method. The multi-channel radio frequency transceiving method can be executed by any of the multi-channel radio frequency transceiving devices provided in the above implementations. Therefore, the multi-channel radio frequency transceiving method also has the beneficial effects of any of the above multi-channel radio frequency transceiving devices. The similarities can be understood with reference to the explanation of the multi-channel radio frequency transceiving device above, and will not be repeated here.

Figure 6:
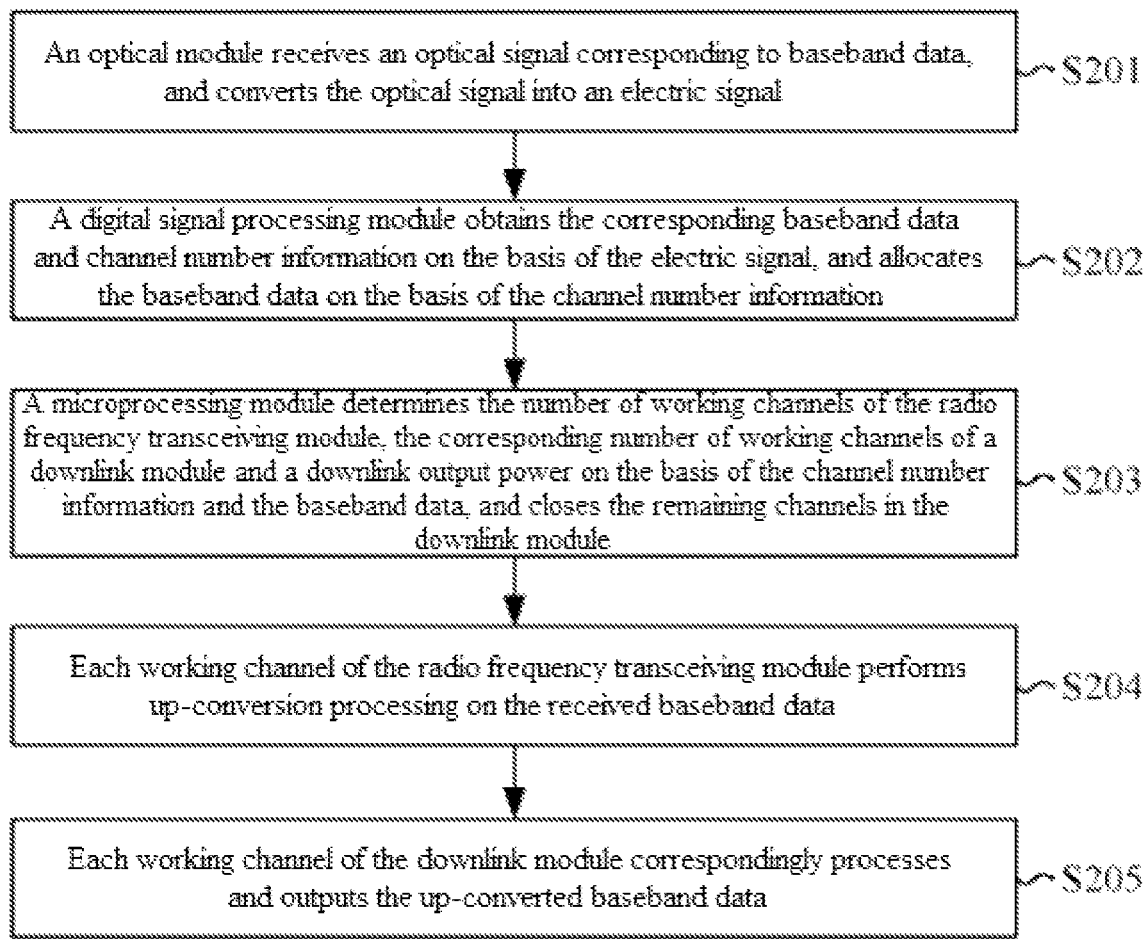
FIG. 6 is a schematic flowchart of a multi-channel radio frequency transceiving method according to an embodiment of the present disclosure.

Exemplarily, FIG. 6 is a schematic flowchart of a multi-channel radio frequency transceiving method according to an embodiment of the present disclosure, which shows a signal transmission process. With reference to FIG. 6, the method may include:

S201: An optical module receives an optical signal corresponding to baseband data, and converts the optical signal into an electric signal.

The optical module performs optical-to-electrical conversion and may convert the received optical signal into the electric signal, which facilitates subsequent signal processing.

S202: A digital signal processing module obtains the corresponding baseband data and channel number information on the basis of the electric signal, and allocates the baseband data on the basis of the channel number information.

The digital signal processing module converts the electric signal from the optical module into a baseband signal with satisfactory format and obtains the channel number information; and allocates and processes the baseband data on the basis of the channel number information.

S203: A microprocessing module determines the number of working channels of the radio frequency transceiving module, the corresponding number of working channels of a downlink module and a downlink output power on the basis of the channel number information and the baseband data, and closes the remaining channels in the downlink module.

The microprocessing module can adjust the number of working channels of the radio frequency transceiving module and the downlink module on the basis of the channel number information of the digital signal processing module and upper computer control information, and close the unnecessary channels.

S204: Each working channel of the radio frequency transceiving module performs up-conversion processing on the received baseband data.

This step makes preparations for subsequent signal multiplication.

S205: Each working channel of the downlink module correspondingly processes and outputs the up-converted baseband data.

The downlink module outputs the data corresponding to each channel after amplification and distribution or integration, so as to realize the signal transmission with a specific number of working channels and a specific output power.

The multi-channel radio frequency transceiving method provided by the embodiment of the present disclosure is realized on the basis of the above transceiving device. The optical module receives the optical signal corresponding to the baseband data, and converts the optical signal into the electric signal. The digital signal processing module determines the channel number information on the basis of the electric signal corresponding to the baseband data, and allocates and processes the baseband data. The microprocessing module reads the channel number information and upper computer control information, thereby determining the number of working channels and the maximum downlink output power of the downlink module and closing the unnecessary hardware channels in the downlink module. The microprocessing module sets the channels of the radio frequency transceiving module and the channels of the downlink module on the basis of the determined information about the number of working channels and the power, and processes the downlink signal, and then each channel of the downlink module in the working state correspondingly outputs the processed downlink signal. In this way, the number of sending channels can be changed adaptively, which is beneficial to realizing intelligent control and reduce the power consumption of equipment. Moreover, the sending power of the channel can be changed according to different levels, so that the multi-channel radio frequency transceiving method is suitable for various signal coverage occasions and is high in applicability and easy to implement.

Besides, there is no need to replace the equipment hardware or rebuild the station, which is beneficial to saving the resources.

Figure 7:
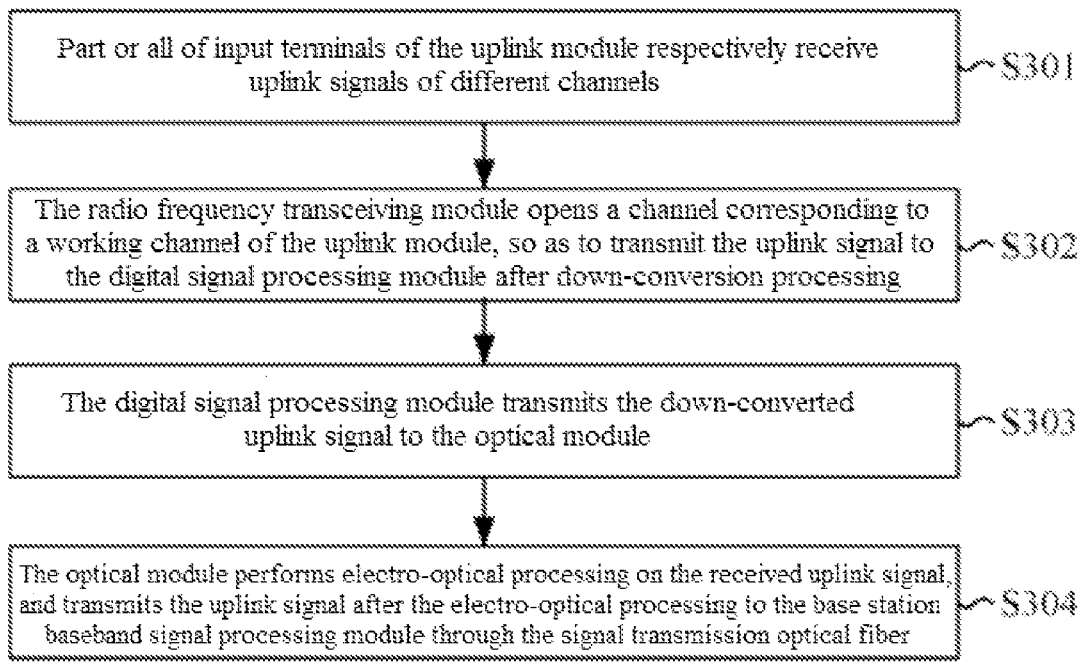
FIG. 7 is a schematic flowchart of another multi-channel radio frequency transceiving method according to an embodiment of the present disclosure.

In an embodiment, the multi-channel radio frequency transceiving device further includes an uplink module, a signal transmission optical fiber and a base station baseband signal processing module. Based on this, FIG. 7 is a schematic flowchart of another multi-channel radio frequency transceiving method according to an embodiment of the present disclosure. With reference to FIG. 7, the method may further include: under the control of the microprocessing module:

S301: Part or all of input terminals of the uplink module respectively receive uplink signals of different channels.

According to the receiving demand of the uplink signals, the uplink module opens part or all the channels under the control of the microprocessing module so as to receive the uplink signals of different numbers of channels.

S302: The radio frequency transceiving module opens a channel corresponding to a working channel of the uplink module, so as to transmit the uplink signal to the digital signal processing module after down-conversion processing.

The radio frequency transceiving module opens the channel corresponding to the uplink module under the control of the microprocessing module, so as to realize transmission of the uplink signal to the digital signal processing module.

S303: The digital signal processing module transmits the down-converted uplink signal to the optical module.

This step realizes transmission of the uplink signal from the digital signal processing module to the optical module.

S304: The optical module performs electro-optical processing on the received uplink signal, and transmits the uplink signal after the electro-optical processing to the base station baseband signal processing module through the signal transmission optical fiber.

This step realizes transmission of the uplink signal from the remote communication equipment to the base station.

Figure 8:
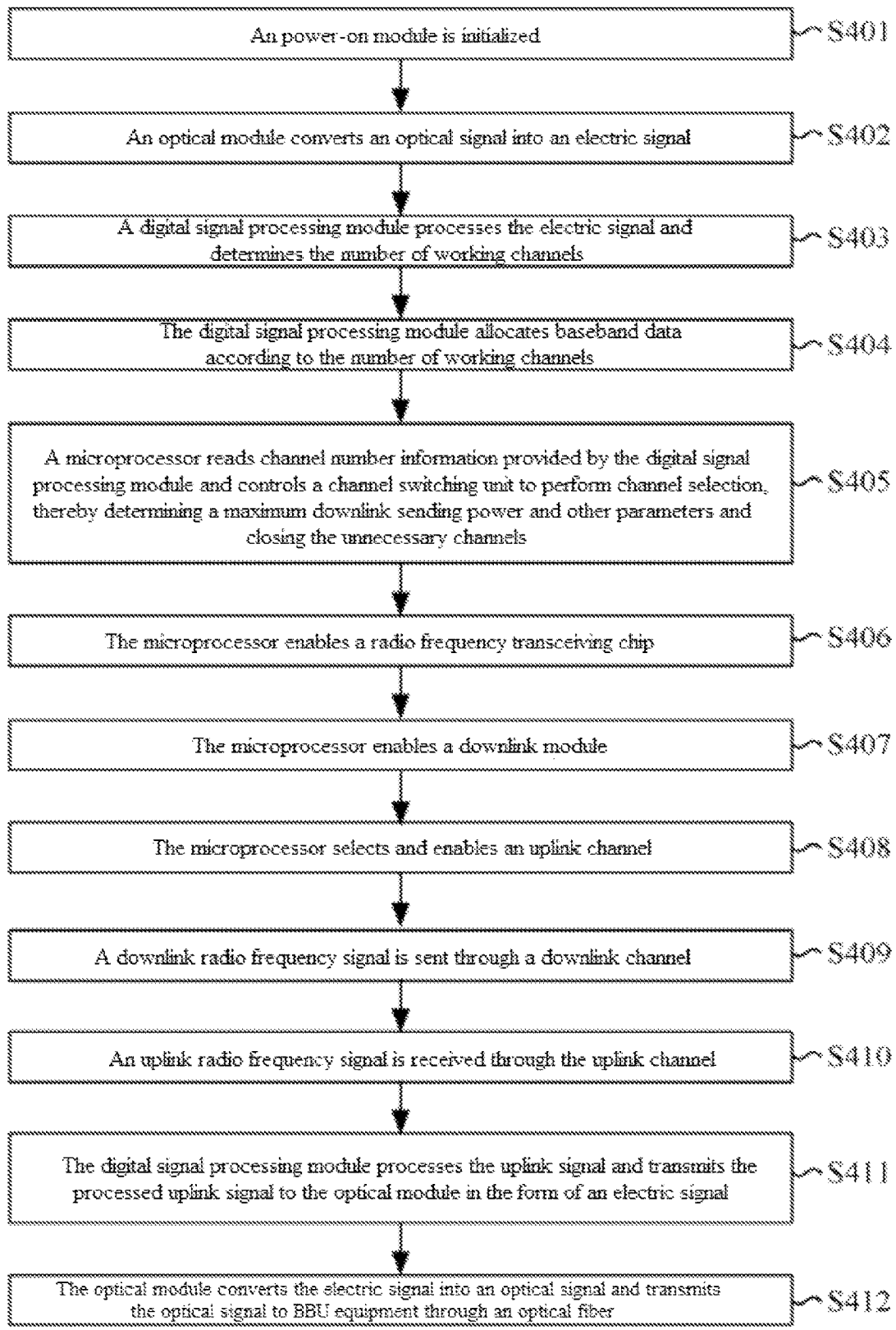
FIG. 8 is a schematic flowchart of still another multi-channel radio frequency transceiving method according to an embodiment of the present disclosure.

On the basis of the above implementations, the microprocessing module may be a microprocessor, the radio frequency transceiving module may be a radio frequency transceiving chip, the signal transmission optical fiber may be called the optical fiber for short, and the base station baseband signal processing module may include Baseband Unit (BBU) equipment in the base station. Based on this, an embodiment of the present disclosure further provides a multi-channel radio frequency transceiving method. Exemplarily, FIG. 8 is a schematic flowchart of still another multi-channel radio frequency transceiving method according to an embodiment of the present disclosure. With reference to FIG. 8, the method may include:

S401: An power-on module is initialized.

S402: An optical module converts an optical signal into an electric signal.

S403: A digital signal processing module processes the electric signal and determines the number of working channels.

S404: The digital signal processing module allocates baseband data according to the number of working channels.

S405: A microprocessor reads channel number information provided by the digital signal processing module and controls a channel switching unit to perform channel selection, thereby determining a maximum downlink sending power and other parameters and closing the unnecessary channels.

S406: The microprocessor enables a radio frequency transceiving chip.

S407: The microprocessor enables a downlink module.

S408: The microprocessor selects and enables an uplink channel.

S409: A downlink radio frequency signal is sent through a downlink channel.

S410: An uplink radio frequency signal is received through the uplink channel.

S411: The digital signal processing module processes the uplink signal and transmits the processed uplink signal to the optical module in the form of an electric signal.

S412: The optical module converts the electric signal into an optical signal and transmits the optical signal to BBU equipment through an optical fiber.

The embodiments of the present disclosure provide a flexible multi-channel radio frequency transceiving device and method. The method includes the following steps: 1) The BBU equipment in the base station converts the communication baseband data into the serial electric signal, and the serial electric signal is processed by equipment and transmitted to the remote radio frequency transceiving equipment in the form of the optical signal through the optical fiber. 2) The optical module converts the optical signal from the optical fiber into the electric signal. 3) The digital signal processing module converts the electric signal from the optical module into the baseband signal with the preset format, obtains the channel number information, and allocates and processes the baseband data according to the number of working channels. 5) The microprocessing module reads the channel number information of the digital signal processing module and the upper computer control information, thereby determining the downlink channel and the maximum downlink output power and closing the unnecessary hardware channels. 6) The channels of the radio frequency transceiving module and the channels of the power amplifier module preset by the microprocessing module perform up-conversion and amplification on the downlink baseband signals. 7) Among the downlink signals amplified by the power amplifier modules, a part of the signals are sent as sampling signals into the radio frequency transceiving module and then converted into the intermediate-frequency signals that enter the digital signal processing module, thereby realizing self-feedback closed-loop control; and the other part of the signals are output through the preset channels of the multi-port output and switching module. 8) The uplink module performs low-noise amplification processing on the multi-channel uplink signals and inputs the amplified uplink signals into the radio frequency transceiving module for processing. 9) The radio frequency transceiving module transmits the processed uplink signals to the digital signal processing module. 10) The digital signal processing module transmits the processed uplink data to the optical module. 11) The optical module converts the electric signals from the digital signal processing module into the optical signals and transmits the optical signals to the BBU equipment through the optical fiber.

Compared with the related art, the technical solutions of the embodiments of the present disclosure have the following beneficial effects:

1. The number of sending/receiving channels can be changed adaptively, which reduces the power consumption of equipment. 2. The maximum sending power of the channel can be changed according to different levels, so that the device and method are suitable for various signal coverage occasions. 3. The device and method are high in applicability and easy to implement.

INDUSTRIAL APPLICABILITY

The multi-channel radio frequency transceiving device provided by the present disclosure includes the optical module, the digital signal processing module, the radio frequency transceiving module, the downlink module and the microprocessing module. Through the cooperation of the functional modules, the number of sending channels can be changed adaptively, which is beneficial to realizing intelligent control and reduce the power consumption of equipment. Moreover, the maximum sending power of the channel can be changed according to different levels, so that the multi-channel radio frequency transceiving device is suitable for various signal coverage occasions and is high in applicability and easy to implement. Besides, there is no need to replace the equipment hardware or rebuild the station, which is beneficial to saving the resources.

What is claimed is:

1. A multi-channel radio frequency transceiving device, comprising: an optical module, a digital signal processing module, a radio frequency transceiving module, a downlink module and a microprocessing module; wherein
an input terminal of the optical module is configured to receive an optical signal corresponding to baseband data, and an output terminal of the optical module is connected to an input terminal of the digital signal processing module; an interactive terminal of the digital signal processing module is connected to an interactive terminal of the radio frequency transceiving module, and a plurality of output terminals of the radio frequency transceiving module are connected to a plurality of input terminals of the downlink module in one-to-one correspondence; output terminals of the microprocessing module are respectively connected to a control terminal of the optical module, a control terminal of the digital signal processing module and a plurality of control terminals of the downlink module in one-to-one correspondence;
the optical module is configured to convert the optical signal into an electric signal; the digital signal processing module is configured to obtain the baseband data and channel number information on the basis of the electric signal, and allocate and process the baseband data on the basis of the channel number information; the microprocessing module is configured to determine the number of working channels of the radio frequency transceiving module, the corresponding number of working channels of the downlink module and a downlink output power on the basis of the channel number information and the baseband data, and close the remaining channels in the downlink module; each working channel of the radio frequency transceiving module is configured to perform up-conversion on the received baseband data, and each working channel of the downlink module correspondingly processes and outputs the up-converted baseband data; and
the number of channels of the downlink module which are in a working state is adjustable according to different channel number information.

2. The multi-channel radio frequency transceiving device according to claim 1, wherein the downlink module comprises a plurality of power amplifier modules and a multi-port output and switching module;
output terminals of the plurality of power amplifier modules are connected to a plurality of input terminals of the multi-port output and switching module in one-to-one correspondence, input terminals of the plurality of power amplifier modules are connected to the plurality of output terminals of the radio frequency transceiving module in one-to-one correspondence, sampling terminals of the plurality of power amplifier modules are connected to a plurality of sampling signal receiving terminals of the digital signal processing module in one-to-one correspondence, and control terminals of the plurality of power amplifier modules are connected to a plurality of output terminals of the microprocessing module in one-to-one correspondence;
and a control terminal of the multi-port output and switching module is connected to one output terminal of the microprocessing module.

3. The multi-channel radio frequency transceiving device according to claim 2, wherein the multi-port output and switching module comprises a 1/2/4 channel switching and output module, and the radio frequency transceiving module comprises a 4T4R radio frequency transceiving module.

4. The multi-channel radio frequency transceiving device according to claim 3, wherein the 1/2/4 channel switching and output module comprises a first circulator, a second circulator, a third circulator, a fourth circulator, a first resistor, a second resistor, a third resistor, a fourth resistor, a first radio frequency switch, a second radio frequency switch, a third radio frequency switch, a fourth radio frequency switch, a fifth radio frequency switch, a sixth radio frequency switch, a seventh radio frequency switch, an eighth radio frequency switch, a ninth radio frequency switch, a tenth radio frequency switch, a first microstrip line, a second microstrip line, a third microstrip line, a fourth microstrip line, a fifth microstrip line, a sixth microstrip line, a seventh microstrip line, an eighth microstrip line, a ninth microstrip line, a tenth microstrip line, an eleventh microstrip line, a twelfth microstrip line and a thirteenth microstrip line;
an isolation terminal of the first circulator is grounded through the first resistor, an isolation terminal of the second circulator is grounded through the second resistor, an isolation terminal of the third circulator is grounded through the third resistor, and an isolation terminal of the fourth circulator is grounded through the fourth resistor;
an input terminal of the first circulator, an input terminal of the second circulator, an input terminal of the third circulator and an input terminal of the fourth circulator are respectively connected to output terminals of four of the power amplifier modules in one-to-one correspondence;
an output terminal of the first circulator, a first terminal of the first microstrip line and a first terminal of the second microstrip line are connected, a second terminal of the first microstrip line is connected to a first output terminal of the 1/2/4 channel switching and output module, the second terminal of the first microstrip line is connected to a first terminal of the first radio frequency switch, and a second terminal of the first radio frequency switch is grounded; an output terminal of the second circulator, a first terminal of the third microstrip line and a first terminal of the fifth microstrip line are connected, a second terminal of the fifth microstrip line is connected to a third output terminal of the 1/2/4 channel switching and output module, the second terminal of the fifth microstrip line is connected to a first terminal of the fourth radio frequency switch, and a second terminal of the fourth radio frequency switch is grounded; a second terminal of the third microstrip line, a second terminal of the second microstrip line, a second terminal of the fourth microstrip line and a first terminal of the sixth microstrip line are connected to each other and connected to a first terminal of the second radio frequency switch, a second terminal of the second radio frequency switch is grounded, a first terminal of the fourth microstrip line is connected to a second output terminal of the 1/2/4 channel switching and output module, the first terminal of the fourth microstrip line is connected to a first terminal of the third radio frequency switch, and a second terminal of the third radio frequency switch is grounded; an output terminal of the third circulator, a first terminal of the ninth microstrip line and a first terminal of the tenth microstrip line are connected, a second terminal of the ninth microstrip line is connected to a fifth output terminal of the 1/2/4 channel switching and output module, the second terminal of the ninth microstrip line is connected to a first terminal of the seventh radio frequency switch, and a second terminal of the seventh radio frequency switch is grounded; an output terminal of the fourth circulator, a first terminal of the eleventh microstrip line and a first terminal of the twelfth microstrip line are connected, a second terminal of the twelfth microstrip line is connected to a seventh output terminal of the 1/2/4 channel switching and output module, the second terminal of the twelfth microstrip line is connected to a first terminal of the tenth radio frequency switch, and a second terminal of the tenth radio frequency switch is grounded; a second terminal of the tenth microstrip line, a second terminal of the eleventh microstrip line, a second terminal of the thirteenth microstrip line and a first terminal of the eighth microstrip line are connected to each other and connected to a first terminal of the eighth radio frequency switch, a second terminal of the eighth radio frequency switch is grounded, a first terminal of the thirteenth microstrip line is connected to a sixth output terminal of the 1/2/4 channel switching and output module, the first terminal of the thirteenth microstrip line is connected to a first terminal of the ninth radio frequency switch, and a second terminal of the ninth radio frequency switch is grounded; and a second terminal of the sixth microstrip line, a second terminal of the eighth microstrip line and a first terminal of the seventh microstrip line are connected to each other and connected to a first terminal of the fifth radio frequency switch, a second terminal of the fifth radio frequency switch is grounded, a second terminal of the seventh microstrip line is connected to a fourth output terminal of the 1/2/4 channel switching and output module, the second terminal of the seventh microstrip line is connected to a first terminal of the sixth radio frequency switch, and a second terminal of the sixth radio frequency switch is grounded.

5. The multi-channel radio frequency transceiving device according to claim 4, wherein an electrical length of each microstrip line is a quarter of a wavelength, and the wavelength is a wavelength in a working frequency range; characteristic impedances of the first microstrip line, the second microstrip line, the third microstrip line, the fifth microstrip line, the ninth microstrip line, the eleventh microstrip line and the twelfth microstrip line are a first characteristic impedance A1, characteristic impedances of the sixth microstrip line and the eighth microstrip line are a second characteristic impedance A2, characteristic impedances of the fourth microstrip line and the thirteenth microstrip line are a third characteristic impedance A3, and a characteristic impedance of the seventh microstrip line is a fourth characteristic impedance A4; and A1, A2, A3 and A4 satisfy:

$$A1=2*A2=X, A3=\sqrt{X^2/2}, A4=\sqrt{X^2/4},$$

wherein X is a constant.

6. The multi-channel radio frequency transceiving device according to claim 1, further comprising: a base station baseband signal processing module, an electro-optical conversion module and a signal transmission optical fiber; wherein
the base station baseband signal processing module is configured to convert communication baseband data into an initial electric signal, the initial electric signal is converted into the optical signal by the electro-optical conversion module, and the optical signal is transmitted to the optical module by the signal transmission optical fiber.

7. The multi-channel radio frequency transceiving device according to claim 6, further comprising: an uplink module; wherein a plurality of input terminals of the uplink module are respectively configured to receive uplink signals of different channels, a plurality of control terminals of the uplink module are respectively connected to a plurality of output terminals of the microprocessing module in one-to-one correspondence, and a plurality of output terminals of the uplink module are respectively connected to a plurality of receiving terminals of the radio frequency transceiving module in one-to-one correspondence; and
the microprocessing module is configured to control the radio frequency transceiving module to open a channel corresponding to a working channel of the uplink module, so as to transmit the uplink signal received by the uplink module to the digital signal processing module after down-conversion processing.

8. The multi-channel radio frequency transceiving device according to claim 7, wherein the digital signal processing module is configured to transmit the down-converted uplink signal to the optical module, and the optical module is configured to perform electro-optical processing on the received uplink signal and transmit the uplink signal after the electro-optical processing to the base station baseband signal processing module through the signal transmission optical fiber.

9. A multi-channel radio frequency transceiving method, executed by the multi-channel radio frequency transceiving device according to claim 1, comprising:
receiving, by an optical module, an optical signal corresponding to baseband data, and converting the optical signal into an electric signal;
obtaining, by a digital signal processing module, the corresponding baseband data and channel number information on the basis of the electric signal, and allocating and processing the baseband data on the basis of the channel number information;
determining, by a microprocessing module, the number of working channels of a radio frequency transceiving module, the corresponding number of working channels of a downlink module and a downlink output power on the basis of the channel number information and the baseband data, and closing the remaining channels in the downlink module;
performing, by each working channel of the radio frequency transceiving module, up-conversion processing on the received baseband data; and
processing and outputting correspondingly, by each working channel of the downlink module, the up-converted baseband data.

10. The multi-channel radio frequency transceiving method according to claim 9, wherein the multi-channel radio frequency transceiving device further comprises an uplink module, a signal transmission optical fiber and a base station baseband signal processing module; and the method further comprises: under the control of the microprocessing module:

receiving, by part or all of input terminals of the uplink module respectively, uplink signals of different channels;

opening, by the radio frequency transceiving module, a channel corresponding to a working channel of the uplink module, so as to transmit the uplink signal to the digital signal processing module after down-conversion processing;

transmitting, by the digital signal processing module, the down-converted uplink signal to the optical module; and performing, by the optical module, electro-optical processing on the received uplink signal, and transmitting the uplink signal after the electro-optical processing to the base station baseband signal processing module through the signal transmission optical fiber.

* * * * *